(12) United States Patent
Omoigui

(10) Patent No.: US 9,009,093 B1
(45) Date of Patent: Apr. 14, 2015

(54) DEAL SCHEDULING BASED ON USER LOCATION PREDICTIONS

(71) Applicant: Amazon Technologies, Inc., Reno, NV (US)

(72) Inventor: Nosakhare D. Omoigui, Sammamish, WA (US)

(73) Assignee: Amazon Technologies, Inc., Reno, NV (US)

( * ) Notice: Subject to any disclaimer, the term of this patent is extended or adjusted under 35 U.S.C. 154(b) by 254 days.

(21) Appl. No.: 13/645,268

(22) Filed: Oct. 4, 2012

(51) Int. Cl.
*G06N 5/00* (2006.01)
*G06Q 10/00* (2012.01)
*G06K 15/00* (2006.01)

(52) U.S. Cl.
CPC ................................. *G06K 15/002* (2013.01)

(58) Field of Classification Search
None
See application file for complete search history.

(56) References Cited

U.S. PATENT DOCUMENTS

| | | | |
|---|---|---|---|
| 6,269,343 B1 | 7/2001 | Pallakoff | |
| 7,668,747 B2 | 2/2010 | Murphy et al. | |
| 7,672,897 B2 | 3/2010 | Chung et al. | |
| 8,364,171 B2* | 1/2013 | Busch | 455/456.1 |
| 2003/0190921 A1* | 10/2003 | Stewart | 455/456.3 |
| 2009/0125380 A1* | 5/2009 | Otto et al. | 705/10 |
| 2010/0287103 A1* | 11/2010 | Mason | 705/80 |
| 2013/0006735 A1* | 1/2013 | Koenigsberg et al. | 705/14.12 |

* cited by examiner

*Primary Examiner* — Alan Chen
(74) *Attorney, Agent, or Firm* — Lee & Hayes, PLLC

(57) ABSTRACT

Techniques for scheduling deals based on predicted user locations are described herein. In particular implementations, a service provider may aggregate location information for multiple users. In one example, the location information comprises check-in information shared by a user through a location-based service. The service provider may utilize the aggregated location information to predict future user traffic for a geographical region associated with a deal or a merchant of the deal. In some instance, the deal comprises an offer of an item for acquisition at a discounted value for a period of time, such as a period of hours, days, or weeks. The predicted user traffic may be used by the service provider, merchant, or others to identify the time period and discounted value at which to offer the deal for acquisition.

28 Claims, 6 Drawing Sheets

DEAL SCHEDULING BASED ON USER LOCATION PREDICTIONS

BACKGROUND

Service providers, such as online deal sites, often offer an item or items for acquisition as a deal at a discounted price. The deal may be published or otherwise made available for acquisition during a predetermined time period, such as a period of hours, days, or weeks. In many instances, the service provider or a merchant of a deal may arbitrarily schedule the deal to be published during a particular time period to users of a geographical area. As more deals are made available to be published through a service provider, there is an increasing need to intelligently schedule deals.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
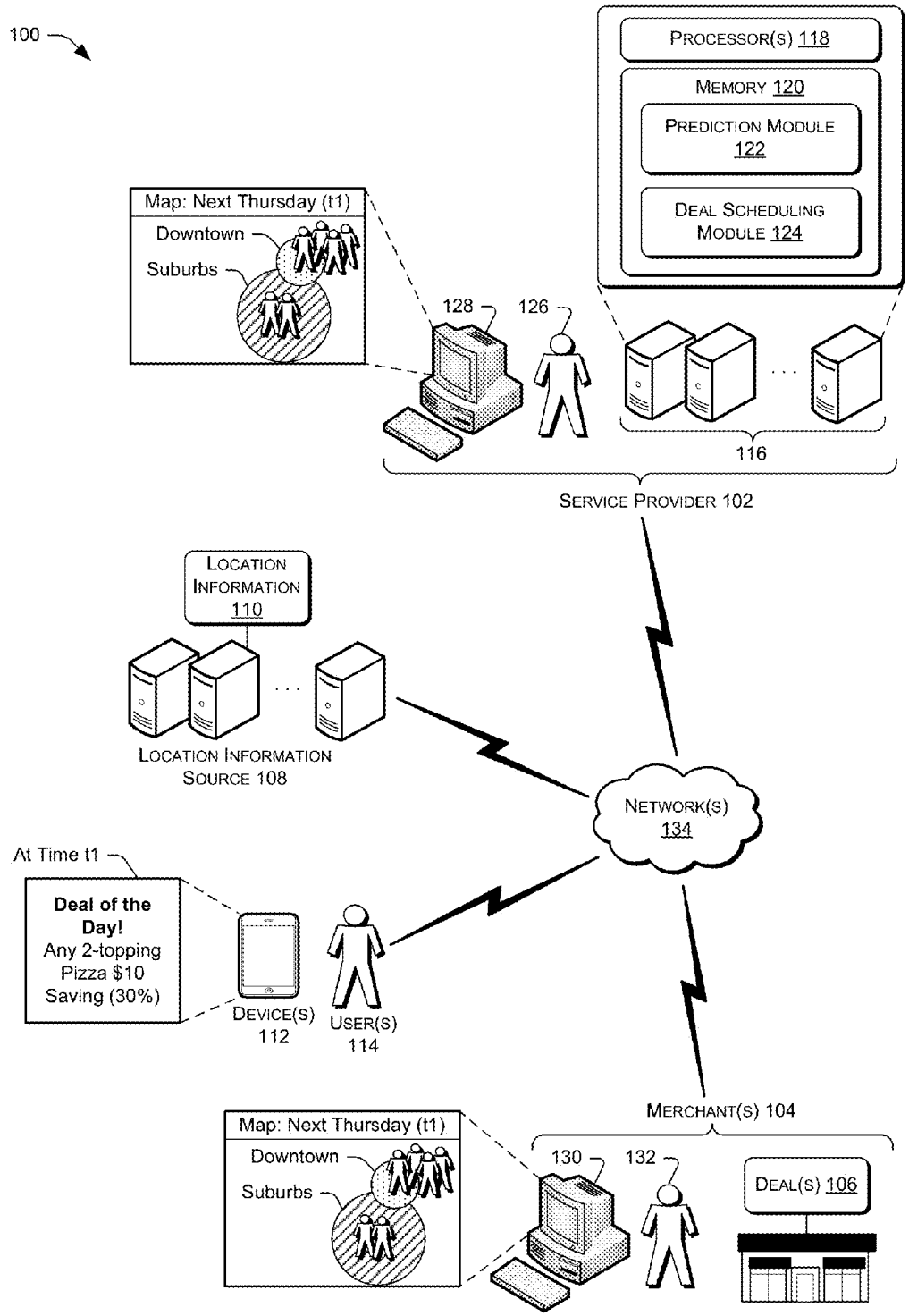
FIG. 1 illustrates an example architecture to schedule deals for acquisition based on predicted user traffic.

This disclosure describes techniques directed to, in part, creating predicted user traffic to enable a service provider, merchant, or others to intelligently schedule a deal for acquisition. In particular implementations, a service provider may aggregate location information for multiple users, such as check-in information shared by a user through a location-based service. The service provider may utilize the aggregated location information to predict future user traffic for a geographical region associated with a deal or a merchant of the deal. In some instance, the deal comprises an offer of an item for acquisition at a discounted value for a period of time, such as a period of hours, days, or weeks. The predicted user traffic may be used by the service provider, merchant, or others, to identify an optimum time period and/or discounted value at which to offer the deal for acquisition. One implementation of the techniques described herein may be understood in the context of the following illustrative and non-limiting example.

A service provider, such as an online deal site, obtains publicly available location information for multiple users from a location-based social networking service. The location information indicates locations at which users have "checked-in" in order to make their locations publicly known. The service provider also identifies attributes or preferences of the users that have been made publicly available, such as gender, likes and dislikes, and so on. The service provider uses this location information to generate user traffic information generally indicating user congregation areas over time and the types of users that congregate in these areas. In this example, the user traffic information indicates that a relatively large number of people aggregate at a particular plaza every Thursday evening from 5-8 PM.

The service provider then uses the user traffic information to predict future user traffic for the next month. In this example, the service provider predicts that a relatively large number of users will be located at the plaza next Thursday. The service provider also determines that a substantial portion of these users have shown an interest in pizza (e.g., based on these users "checking-in" to pizza restaurants over the past three months).

The future user traffic is presented to a scheduler (e.g., user) associated with the service provider to schedule a deal. The information is presented with options to filter through different types of users, merchants, categories, and so on. The scheduler recognizes that a relatively large estimated number of users that like pizza will be located at the plaza next Thursday. The scheduler references a list of deals that are available to be published (e.g., offered for acquisition) and selects a pizza deal for "any 2-topping pizza" from a merchant located in the plaza. The scheduler schedules the pizza deal to be made available to a geographical region around the pizza merchant. The deal is scheduled to be acquired between Tuesday and Thursday in order to allow users the opportunity to acquire the deal before they travel to the plaza. Further, with authorization from the merchant, and knowing that the demand will be relatively high for pizza on that day due to the large number of users in that area, the scheduler sets the discount relatively low (e.g., at 30% off instead of 50% off). On Tuesday as scheduled, the service provider publishes the pizza deal to an online deal site for the geographical region around the merchant.

In some instances, by predicting future user traffic, a service provider may identify future demand for a deal, a deal category, or a merchant. This may enable the service provider, a user associated with the service provider, a merchant, or others, to schedule deals in an intelligent manner. For example, this may allow the service provider to select a time period in which a deal will be offered and/or a discount to be applied to the deal based on predicted demand for the deal. This may also increase an acquisition of the deals, which may lead to increased revenue for the service provider and/or the merchants.

In many instances, the techniques described herein obtain location information, user preference information, user attribute information, and other user-based information. It should be understood that this information comprises publicly available information, information that is obtained with the explicit consent of the user, and/or information that has been processed to remove identifying information (e.g., names, addresses, etc.).

This brief introduction is provided for the reader's convenience and is not intended to limit the scope of the claims, nor the proceeding sections. Furthermore, the techniques described in detail below may be implemented in a number of ways and in a number of contexts. One example implementation and context is provided with reference to the following figures, as described below in more detail. It is to be appreciated, however, that the following implementation and context is but one of many.

Example Architecture

FIG. 1 illustrates an example architecture 100 to schedule deals for acquisition based on predicted user traffic (e.g., predicted demand). The architecture 100 includes a service provider 102 to predict user traffic and facilitate scheduling of deals. The architecture 100 also includes one or more merchants 104 to provide one or more deals 106 to the service provider 102 and a location information source 108 (hereinafter location source 108) to provide location information 110 to the service provider 102. Further, the architecture 100 includes one or more computing devices 112 configured to receive the one or more deals 106 and/or interact with one or more users 114.

The service provider 102 may include one or more computing devices 116, such as one or more servers, laptop computers, desktop computers, and the like. In some instances, the one or more computing devices 116 are configured in a cluster, farm, data center, mainframe architecture, cloud computing environment, or a combination thereof. In one example, the service provider 102 may provide cloud computing resources, including computational resources, storage resources, and the like in a cloud environment.

The one or more computing devices 116 are equipped with one or more processors 118 and memory 120. The memory 120 may include software functionality configured as one or more "modules." As illustrated in FIG. 1, the memory 120 includes a prediction module 122 and a deal scheduling module 124. These modules (and all other modules described herein) are intended to represent example divisions of the software for purposes of discussion, and are not intended to represent any type of requirement or required method, manner or necessary organization. Accordingly, while various "modules" are discussed, their functionality and/or similar functionality could be arranged differently (e.g., combined into a fewer number of modules, broken into a larger number of modules, etc.).

The prediction module 122 may predict future user traffic for one or more geographical regions. The future user traffic may be based on previous user traffic for the one or more geographical regions and/or one or more scheduled events (e.g., a sporting event, political event, concert, etc.). By predicting future user traffic, the module 122 may generally estimate an amount of demand for a deal, deal category, merchant, and so on. Further details of the prediction module 122 will be discussed below in reference to FIG. 2.

The deal scheduling module 124 may facilitate the scheduling of the one or more deals 106. A deal may generally be scheduled based on future user traffic. For example, the module 124 may provide information about future user traffic to the merchant 104 and/or a scheduler 126 to enable the merchant 104 and/or scheduler 126 to schedule a deal. Further, in some instances a deal is automatically scheduled when the future user traffic satisfies one or more criteria. Further details of the deal scheduling module 124 will be discussed below in reference to FIG. 2.

The memory 118 (and all other memory described herein) may include one or a combination of computer readable storage media. Computer storage media includes volatile and non-volatile, removable and non-removable media implemented in any method or technology for storage of information such as computer readable instructions, data structures, program modules, or other data. Computer storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. As defined herein, computer storage media does not include communication media, such as modulated data signals and carrier waves. As such, computer storage media includes non-transitory media.

The service provider 102 may be associated with and/or comprise one or more computing devices 128 associated with the scheduler 126. The one or more computing devices 128 may be implemented as, for example, one or more servers, laptop computers, desktop computers, and the like. The scheduler 126 may interact with the one or more devices 128 to view information related to a deal, such as future user traffic, and/or to schedule the deal for acquisition. In some instances, the user 126 may receive information that is specific to the service provider 102. In the illustrated example of FIG. 1, the one or more devices 128 display a map illustrating future user traffic for the downtown and suburbs regions. Although the one or more computing devices 128 and scheduler 126 are illustrated in FIG. 1 as being included as part of the service provider 102, in some instances the one or more devices 128 and/or scheduler 126 may be located separately from the service provider 102 (e.g., remotely).

The one or more merchants 104 may be associated with and/or comprise one or more computing devices 130 associated with a user 132. The one or more computing devices 130 may be implemented as, for example, one or more servers, laptop computers, desktop computers, and the like. The user 132 may interact with the one or more devices 130 to view information related to a deal, such as future user traffic, and/or to schedule the deal for acquisition. In some instances, the user 132 may receive information that is specific to the merchant 104. As similarly discussed above with respect to the one or more devices 128, the one or more devices 130 may display a map illustrating future user traffic for the downtown and suburbs regions. Although the one or more computing devices 130 and user 132 are illustrated in FIG. 1 as being included as part of the one or more merchants 104, in some instances the one or more devices 130 and/or user 132 may be located separately from the one or more merchants 104 (e.g., remotely).

The location source 108 may be implemented as one or more computing devices, such as one or more servers, laptop computers, desktop computers, and the like. In one example, the location source 108 includes computing devices configured in a cluster, farm, data center, mainframe architecture, cloud computing environment, or a combination thereof. For instance, the location source 108 may provide cloud computing resources, including computational resources, storage resources, and the like in a cloud environment.

The location source 108 may store the location information 110 in a data store for access by the service provider 102, the one or more merchants 104, and/or the devices 112. The location information 110 may have been provided from the one or more devices 112 or other devices. As discussed in further detail below, the location information 110 may generally indicate one or more locations associated with one or more users, such as a "check-in" location, a located through which a user traveled, a location at which a user resides, and so on. In one example, the location source 108 comprises a location-based social networking service, such as Foursquare®, Google Latitude®, Google+®, Facebook Places®, and so on.

The devices 112 may be implemented as a laptop computer, a desktop computer, a smart phone, an electronic reader device, a mobile handset, a personal digital assistant (PDA), a portable navigation device, a portable gaming device, a tablet computer, a watch, a portable media player, another client device, and the like.

The devices 114 may receive the one or more deals 106 through the service provider 102. That is, the service provider 102 may generally manage which deals are made available to the one or more devices 112 for acquisition. Further, in some instances the devices 114 may provide location information to the service provider 102 and/or location source 108.

The service provider 102, one or more merchants 104, location source 108, and/or one or more devices 112 may communicate via one or more networks 134. The one or more networks 134 may include any one or combination of multiple different types of networks, such as cellular networks, wireless networks, Local Area Networks (LANs), Wide Area Networks (WANs), and the Internet.

In one illustrative example of the architecture 100 of FIG. 1, the service provider 102 obtains location information for users and predicts future user traffic for a downtown region and a suburb region for next Thursday (a future time t1). The service provider 102 makes this information available to the scheduler 126 and/or the user 132. The scheduler 126 and/or the user 132 recognize that a relatively large number of users that like pizza are estimated to be congregated in the downtown region on next Thursday. The scheduler 126 and/or user 132 schedule a pizza deal for "any 2-toping pizza" to be offered next Thursday and specify that a 30% discount be applied to the regular price. As scheduled on next Thursday (time t1), the pizza deal is offered for acquisition to the user 114 through the device 112.

Example Service Provider

Figure 2:
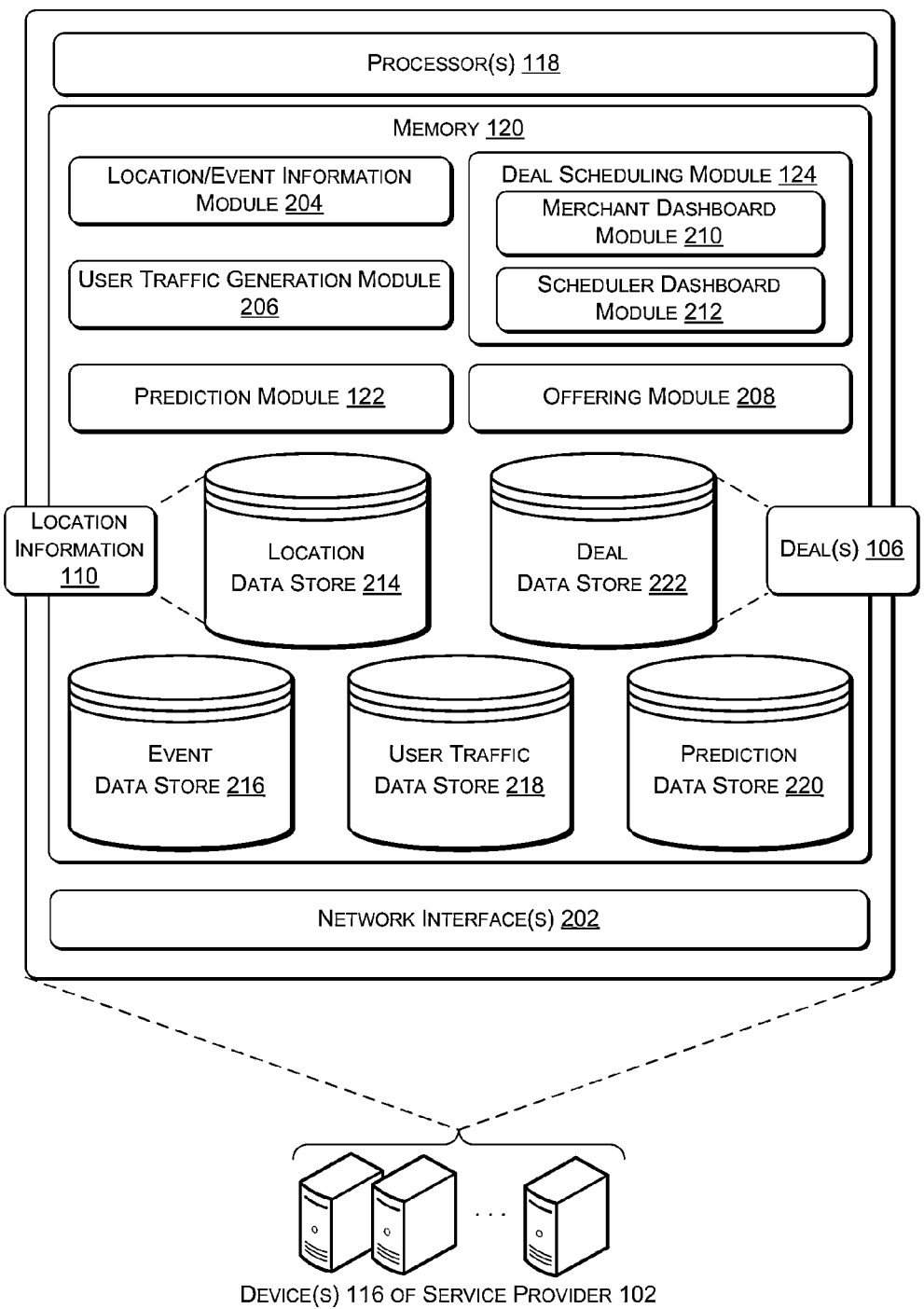
FIG. 2 illustrates further details of the one or more computing devices of the service provider of FIG. 1

FIG. 2 illustrates further details of the one or more computing devices 116 of the service provider 102 of FIG. 1. The one or more computing devices 116 (hereinafter devices 116) include the one or more processors 118, the memory 120, and one or more network interfaces 202. The one or more network interfaces 202 may enable the devices 116 to communicate over the one or more networks 134 and/or other networks.

The memory 120 may include a location/event information module 204, a user traffic generation module 206, the deal scheduling module 124, the prediction module 122, and an offering module 208. The deal scheduling module 124 may include a merchant dashboard module 210 and a scheduler dashboard module 212.

The location/event information module 204 may manage the location information 110 stored in a location data store 214 and/or event information stored in an event data store 216. For example, the module 204 may communicate with the location source 108 to obtain the location information 110 for multiple users and store the information 110. As such, the location information module 204 may aggregate location information for multiple users over time. The location information 110 may indicate a real-time (e.g., current) or previous location of a user including, for example:

"Check-in" data indicating a location shared by a user. The location may be shared through location-based social networking service, such as Foursquare®, Google Latitude®, Google+®, Facebook Places®, Gowalla®, GetGlue®, and Brightkite®. In some instances, this location information may indicate a particular venue, such as a particular store, restaurant, theater, plaza, etc.

Traffic report data indicating a location through which a user has traveled. Here, the user may have traveled along a road, sidewalk, path (e.g., bike path), etc.

Location data obtained from acquisition history data. The location data here may indicate a location at which a user acquired an item.

Mobile device data indicating a location at which a mobile device associated with a user was located.

Location data obtained from call history data. Here, the location data may indicate a location at which a user made a call, sent a text message, and so on.

Network information indicating a location at which a user accessed a network.

Address information indicating a location at which a user resides.

The location information 110 may indicate a relatively broad location of a user, such as a state, country, zip code, region, etc, and/or may indicate a more specific location, such as a geo-location, GPS coordinate, address, etc. Further, in some instances the location information 110 is processed to remove user identification information that identifies a user (e.g., names, addresses, phone numbers, etc.). As such, the location information 110 may be free of user identification information.

Further, the location/event information module 204 may communicate with one or more event sources to obtain event information. The event information may generally indicate a location, time (e.g., future date), and/or an estimated number of participants of a scheduled event. An event may include a sporting event (e.g., football game), political event, concert, parade, fair, and so on. The event information may be obtained from a wide variety of sources including, for example, online sources (e.g., sporting team web site), periodicals (e.g., newspapers, magazines, etc.), and so on.

The user traffic generation module 206 may generate user traffic information from the location information 110. The user traffic information may be stored in a user traffic data store 218. The user traffic information may generally indicate areas in which users have congregated over time. In one example, the information may comprise time series data indicating locations of congregation over time. As such, the user traffic information may indicate trends and/or patterns in user traffic.

The prediction module 122 may predict future user traffic for one or more geographical regions from the user traffic generated by the module 206 and/or the event information stored in the event data store 216. For example, the module 122 may estimate that future user traffic for a particular region during a particular time period will be substantially similar to previous user traffic in the particular region during a similar time period, such as a same day of the pervious user traffic. Alternatively, or additionally, when an event that is scheduled to be held on a particular day is estimated to have a particular number of participants, the module 122 may estimate that the future user traffic on that particular day will be the estimated number of participants. In one example, the module 122 may estimate the future user traffic as the sum of the estimated number of participants to the event and an average number of users that have congregated at the event location in the past (e.g., based on previous user traffic).

The future user traffic may generally indicate an estimated number of users that will be located within a particular region associated with a deal and/or a merchant. As such, the future user traffic may indicate a demand for a deal and/or merchant. For example, when the future user traffic indicates that a relatively large number of users will be located at a particular location, this may indicate a relatively high demand for a deal/merchant. Whereas, a relatively small number of users at a particular location may indicate a relatively low demand for a deal/merchant. The future user traffic may be stored as data in a prediction data store 220.

The deal scheduling module 124 may facilitate scheduling of a deal. In some instances, a deal is automatically scheduled when one or more criteria are satisfied. For example, when future user traffic is estimated to be relatively high during a particular time period in a particular region, the module 124 may automatically schedule the deal for the particular time period in the particular region or in regions adjacent to the region. Alternatively, when future user traffic is estimated to be relatively low during a particular time period, the module 124 may schedule a deal in order to incentivize users to acquire an item. In one example, the module 124 may predict future user traffic for an afternoon based on user traffic for the morning, and automatically schedule a deal to be published during the afternoon when, for example, the predicted future user traffic is above a threshold number of users.

The deal scheduling module 124 may identify one or more parameters for offering a deal for acquisition based on the future user traffic. In some instances, the one or more parameters are determined by the module 124, while in other instances the one or more parameters are identified from user input. The one or more parameters may comprise a time period during which to offer the deal for acquisition (e.g., between Monday and Wednesday), an amount of discount to apply to the deal when offering the deal for acquisition (e.g., 40% off regular price), a geographical region in which to offer the deal for acquisition, and/or a merchant that will offer the deal (e.g., redemption merchant).

In some instances, an amount of discount applied to a deal may vary depending on a number of users that will be located at a particular geographical region. For example, the module 124 may determine a large discount (e.g., 50% off) when an estimated number of individuals indicated in future user traffic data is less than a threshold and determine a small discount (e.g., 20% off) when the estimated number of individuals is greater than or equal to the threshold. This may cause a greater discount to be applied to the deal when demand is low (e.g., when less than a threshold number of individuals will be located in a region).

In some instances, the deal scheduling module 124 not only predicts future user traffic, but also a type of users in the user traffic. For example, the module 124 may reference previous "check-ins" to identify a preference of a user (e.g., Joe likes pizza because he has "checked-in" to four different pizza restaurants in the last two weeks). Knowing this preference, the module 124 may predict that a particular type of user will be located in a particular region (e.g., users that like pizza will be located in the plaza on Tuesday). Alternatively, or additionally, the module 124 may reference event information to determine that a particular type of user of the future user traffic. For instance, when a baseball game is scheduled to take place on a certain day, the module 124 may estimate that users that have a particular level of interest in baseball will be located within proximity to the baseball game on the scheduled day. This information about the types of users of the future user traffic may be output as part of the predicted future user traffic.

In some implementations, the deal scheduling module 124 utilizes a time series forecasting model to predict future user traffic. In one example, an Autoregressive Moving-Average (ARMA) model is used. However, in other examples a stochastic or Markov model (e.g., Markov chain) may be used. In many of these models, the inputs may comprise prior observations, such as a time of day a user is at a location, a day of the month the user is at the location, the month the user is at the location, the season the user is at the location (e.g., winter, summer, etc.), an average frequency that the user is at the location, and so on. In one example, these prior observations are based on check-in data. To illustrate, the model may predict different traffic patterns on Wednesday than on Friday based on check-in data, and accordingly, predict different future user traffic on Wednesday than Friday.

The deal scheduling module 124 may comprise the merchant dashboard module 210 to provide an interface to the merchants 104 (e.g., to the device 130 of the merchant 104). In some instances, the interface comprises a dashboard to enable the user 132 of the merchant 104 to generally manage a deal of the merchant 104. For example, the interface may enable the user 132 to create a new deal, view predicted future user traffic, schedule a deal, send a communication to the service provider 102, and/or view information about previously created and/or scheduled deals (e.g., sales information).

The deal scheduling module 124 may also comprise the scheduler dashboard module 212 to provide an interface to the service provider 102 (e.g., to the device 128 of the service provider 102). In some instances, the interface comprises a dashboard to enable the user 126 of the service provider 102 to generally manage a deal. For example, the interface may enable the user 126 to create a new deal, view predicted future user traffic, schedule a deal, send a communication to the merchant 104, and/or view information about previously created and/or scheduled deals (e.g., sales information).

Meanwhile, the offering module 208 may cause the one or more deals 106 to be offered for acquisition. A deal may be offered for acquisition through an online site (e.g., an online deal website), an application (e.g., an application of a portable device), a notification (e.g., an email, text message, or telephone call), and so on. In one example, a deal is presented to an individual through an interface on an online deal site after the individual has logged onto the deal site. In some instances, a deal that is offered for acquisition has an attribute (e.g., deal category) that is related to an attribute and/or preference of a user associated with predicted user traffic. For example, a pizza deal may be offered for acquisition to a user that has particular interest in pizza and that is predicted to be located at a future time within proximity to a merchant of the pizza deal. As illustrated, the one or more deals 106 may be stored in a deal data store 222.

As used herein, a deal may represent some form of value and/or opportunity that is made available to an individual. For example, a deal may include an item offered for a discount, credit, and/or rebate, an item that may be acquired during a particular time period, an item that is valid to be used during a particular time period, an item that is offered for acquisition to a particular geographical region, an opportunity to attend and/or participate (e.g., tickets to a concert that is already booked, a reservation at a restaurant, etc.), a promotional item, and so on. In some instances, the deal may be provided upon a particular condition being satisfied, such as the acquisition of one or more items, the acquisition of one or more deals, and so on.

As noted above, in some instances a deal is associated with a particular geographical region. That is, the deal may be offered for acquisition to individuals that reside within, that are currently located within, or that subscribe to receive deals with, the particular geographical region. A geographical region may include a particular city block, city, county, state, country, district (e.g., school, political, etc.), and so on. In one example, a geographical region is defined by population such that the geographical region includes a threshold number of individuals (e.g., threshold number of residents). In some instances, the deal may be considered a local deal for individuals of a particular geographical region. Further, in some instances a deal may refer to a combined merchant deal including a deal from a first merchant and a deal from a second merchant offered for acquisition for a single value (e.g., price).

A deal may include terms and conditions specifying, for example, a discount associated with the deal, a threshold minimum or maximum number of participants in the deal, a payment arrangement between a merchant and a service provider (e.g., revenue sharing, flat fee per deal, tiered pricing, contribution profit per unit, etc.), a preferred launch date for the deal, and/or so forth. The deal may further include an expiration date of the deal, a deal category, information about an item(s) being offered in associated with the deal (e.g., a text description of each item, audio or video content associated with an item, etc.), and so on.

A deal category may indicate a particular feature of the deal. In some instances, a deal category corresponds to a category of an item associated with the deal. While in other instances, a deal category corresponds to a category specifically designated for deals. A deal category may be based at least in part on generally known categorization techniques. It should be understood that a deal may be classified into multiple deal categories.

As used herein, an item may include a tangible item, intangible item, product, good, service, bundle of items, digital good, digital service, coupon, and the like. An acquisition of an item and/or deal may be achieved through purchasing, renting, borrowing, trading, bartering, or otherwise acquiring the item and/or deal.

The memory 120 may also store other information, such as user preference information (e.g., likes and dislikes, items/deals or categories of items/deals of which the user has a particular level of interest, etc.), user attribute information (e.g., gender, height, age, weight, hair color, ethnicity, etc.), user status information (e.g., status indicated on a social networking site), and so on. In some instances, this information may enable the service provider 102 to identify users of traffic information (e.g., traffic history and predicted future traffic).

Example Graphs

Figure 3A:
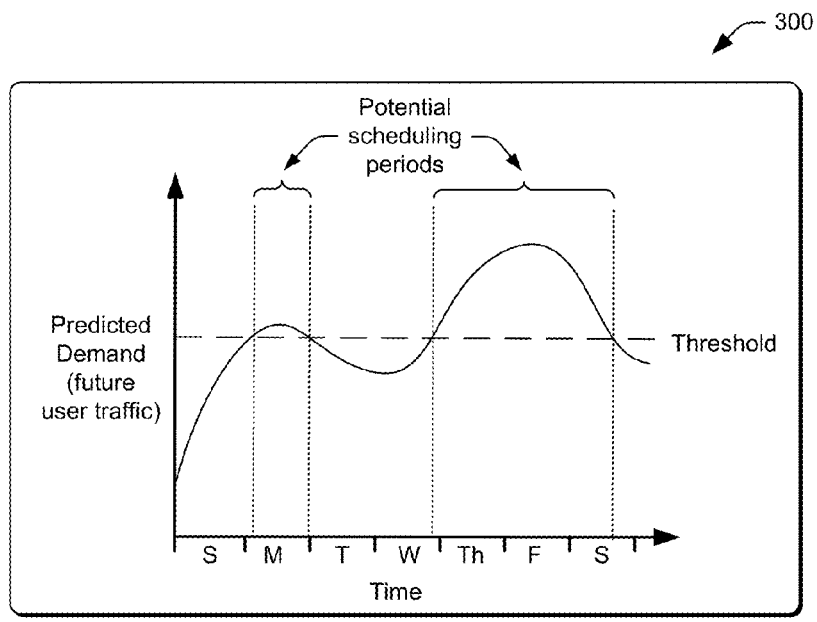
FIGS. 3A-3B illustrate example graphs showing demand for a deal or merchant in a geographical region over time.
Figure 3B:
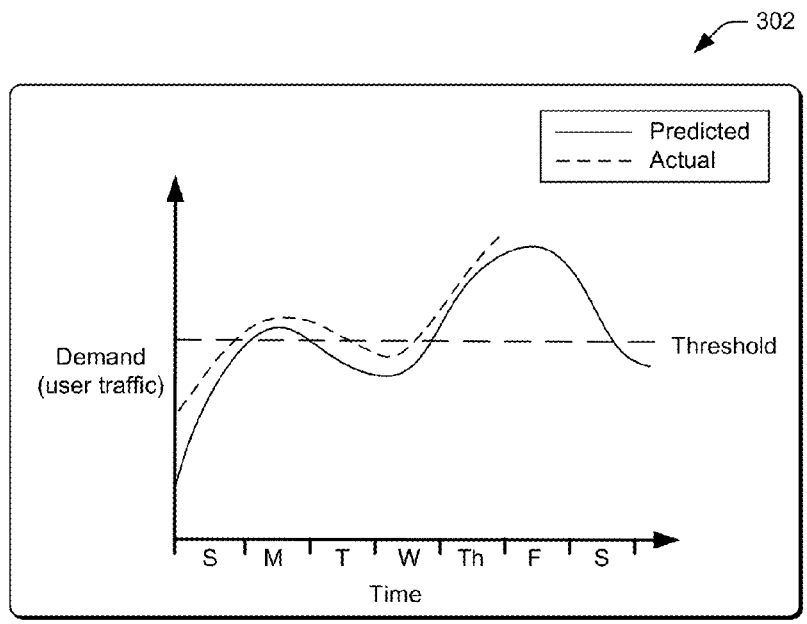

FIGS. 3A-3B illustrate example graphs 300 and 302 showing demand for a deal or merchant in a geographical region over time. In these examples graphs 300 and 302, the demand is representative of user traffic over a period of a week. For example, relatively high demand (e.g., above a threshold) corresponds to many users congregating at an area, whereas relatively low demand corresponds to few users congregating at the area. The graphs 300 and/or 302 may be presented through an interface to, for example, the scheduler 126 of the service provider 102 and/or the user 132 of the merchant 104.

FIG. 3A illustrates the graph 300 showing predicted demand for a particular deal in a particular geographical region. For instance, the graph 300 may be displayed for the pizza deal mentioned above in the downtown plaza region. In one example, the user traffic (e.g., demand) corresponds to those users that have a threshold level of interest in a particular merchant, merchant type, item or deal, category of items or deals (e.g., pizza), etc. This may be based on preferences of the users, attributes of the users, statuses indicated by the users, and so on.

As illustrated, the graph 300 shows that demand for the particular deal in the particular geographical region is relatively high (above the threshold) on Monday, Thursday, Friday, and Saturday. These days may be potential days in which to schedule a deal. Further, for a deal scheduled on Monday, a user or the service provider 102 may choose to apply a higher discount to the deal since the demand is not as high as it is between Thursday and Saturday.

FIG. 3B illustrates the graph 302 showing predicted demand for a particular deal in comparison to actual demand. The actual demand illustrated by the dashed line may be presented after Thursday has passed to indicate the accuracy of the predicted demand relative to the actual demand.

Example Interfaces

Figure 4:
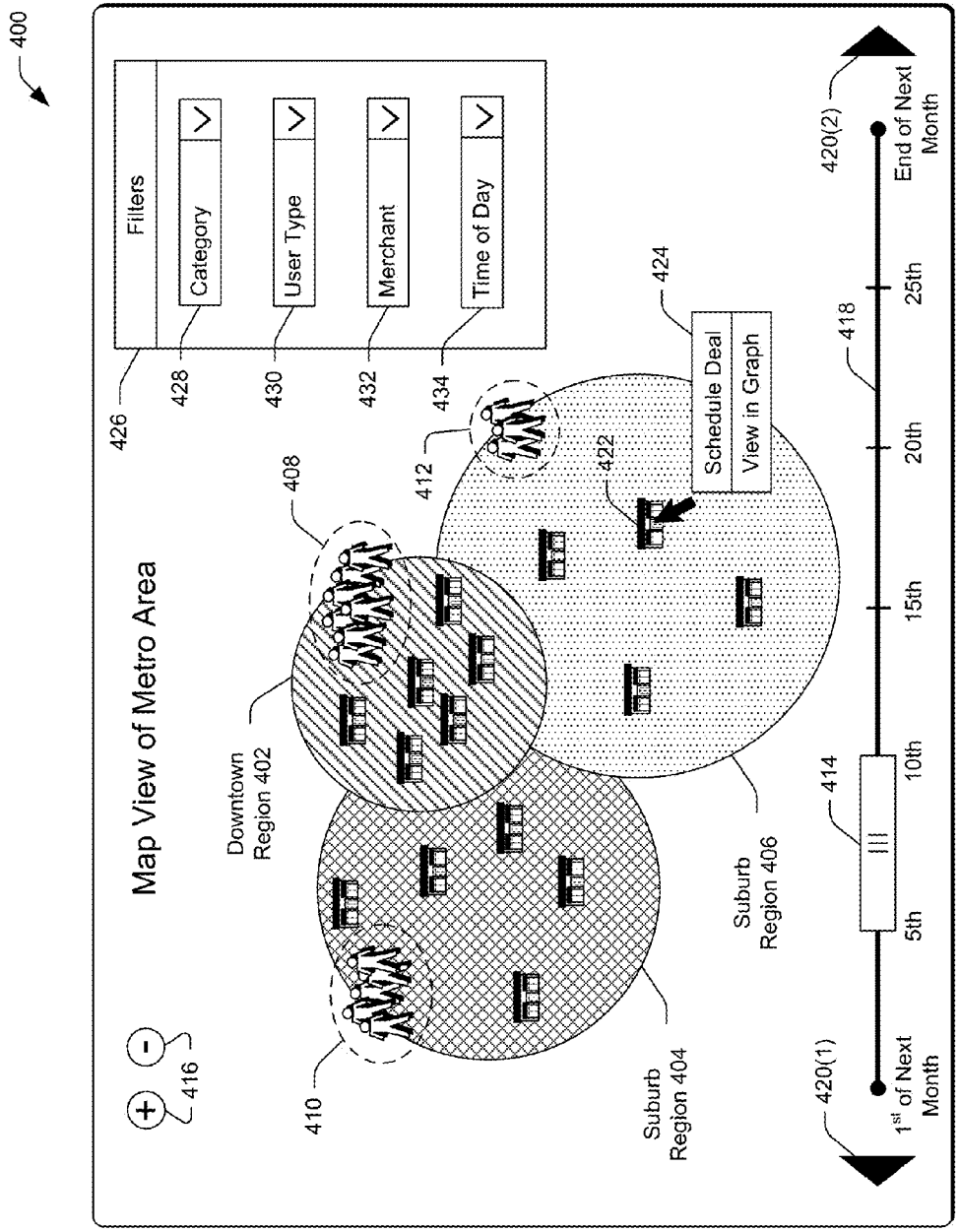
FIG. 4 illustrates an example map view presenting predicted or actual user traffic.
Figure 5:
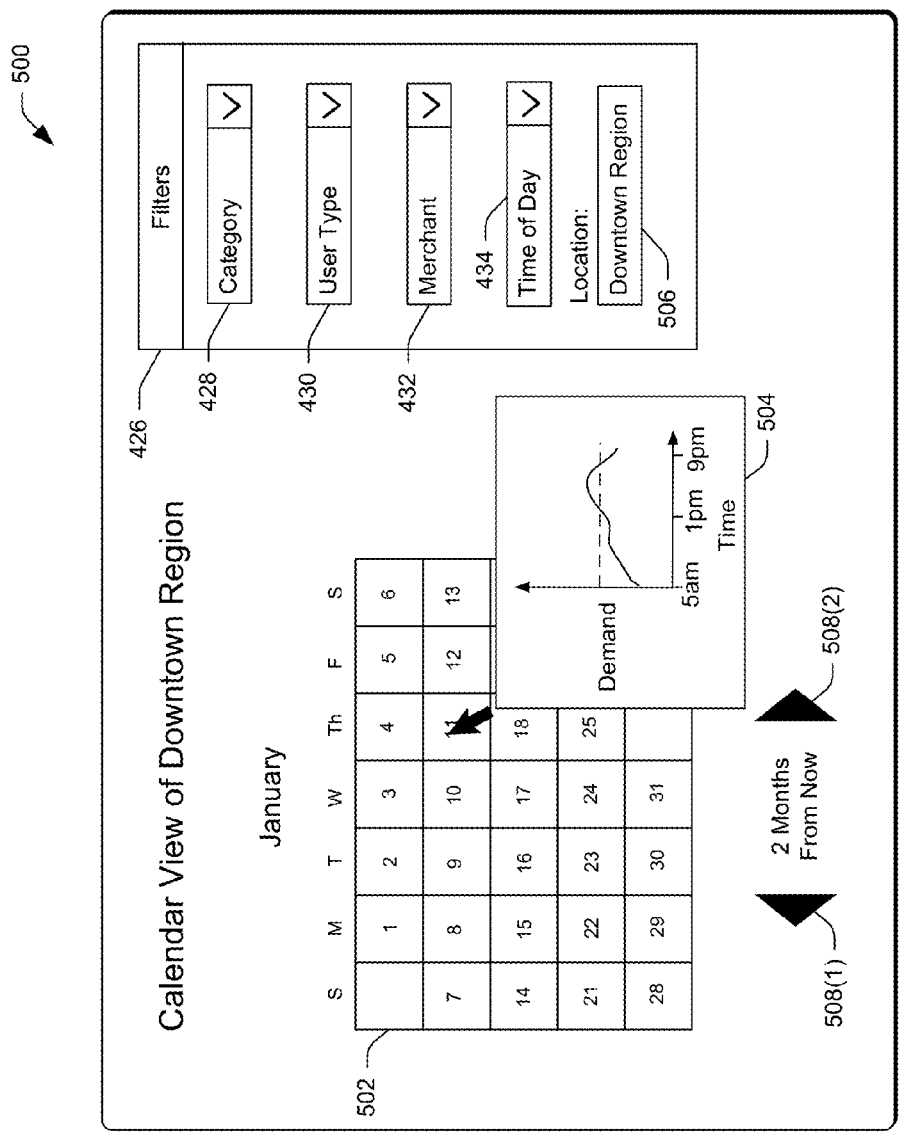
FIG. 5 illustrates an example calendar view presenting predicted or actual user traffic.

FIGS. 4 and 5 illustrate examples interfaces 400 and 500 that may be presented to the scheduler 126 of the service provider 102, the user 132 of the merchant 104, and/or others to view predicted or actual user traffic and schedule a deal. For instance, the interface 400 may be presented to the scheduler 126, while the interface 500 may be presented to the user 132. In one example, the interfaces 400 and/or 500 are presented as a dashboard view of deal related information.

In FIG. 4, the interface 400 shows a map view of the metro-area including a downtown region 402, a suburb region 404, and a suburb region 406. Each of the regions 402-406 are shown with respective visualizations 408-412 to indicate user traffic for the area during a particular time selected by a time slider 414. Each individual shown for the visualizations 408-412 may represent a particular number of users (e.g., twenty or thirty users). The visualizations 408-412 may allow a user to view the relative user traffic for the different regions 402-406. As illustrated, the downtown region 402 has more user traffic than the suburb region 404, and the suburb region 404 has more user traffic than the suburb region 406.

The interface 400 includes different navigational elements to navigate to different views and/or different time periods. In particular, the interface 400 includes zoom elements 416 to enable a user to zoom in or out in the map. The interface 400 also includes the time slider 414 to enable a user to scroll along a timeline 418 and view average user traffic for different time periods. In this example, the time slider 414 corresponds to a five-day window, although other time periods may similarly be used, such as a day, week, and so on. For instance, as illustrated in FIG. 4 the time slider 414 is positioned to show user traffic for a time period between the $5^{th}$ and $10^{th}$ of the particular month shown. Further, the interface 400 includes elements 420(1) and (2) to navigate to different months. By selecting the element 420(1), the map may show user traffic for a previous month (e.g., with respect to the month currently shown). In one example, the map may show user traffic for months that have already passed (e.g., previous user traffic). By selecting the element 420(2), the map may show user traffic for a subsequent month. Although a month view is presented in the example interface 400, it should be appreciated that other views may also be presented, such as a day view, week view, or year view.

The interface 400 also shows merchant icons (e.g., icon 422) to show different merchants within the regions 402-406 and locations of the merchants. Selection of a merchant icon may allow a user to schedule a deal for that merchant and/or view a graph of user traffic for that merchant (e.g., user traffic within direct proximity to the merchant). For example, upon selecting the merchant icon 422, a window 424 may be presented to schedule a deal and/or view a graph specific to user traffic for the merchant. In particular, selection of the text "Schedule Deal" may allow a user to specify one or more parameters for offering a deal for acquisition, such as a time period to offer the deal, an amount of discount to be applied, and so on. Further, selection of the text "View in Graph" may cause a graph similar to the graph 300 or 302 to be displayed for that merchant (e.g., user traffic within a predetermined proximity to the merchant). The graph may be displayed in the interface 400 in an overlaid manner and/or in a separate interface.

The interface 400 may include a filter window 426 to enable a user to filter different types of user traffic presented in the interface 400. The filter window 426 may include drop down menus 428-434 to select different types of information to be filtered. For example, the drop down menu 428 may allow a user to view user traffic for a particular deal/item category. To illustrate, upon selection of a restaurant category, the map may be updated to show user traffic for users that have shown a threshold level of interest in restaurants (e.g., through user preferences that are based on previous "check-ins" to restaurants). This may allow, for example, a restaurant owner to view user traffic for his particular field.

Meanwhile, the drop down menu 430 may update the map with user traffic for particular types of users, such as users having similar preferences, statuses, or attributes (e.g., gender, age, etc.). To illustrate, upon selection of a user type of male, the map may show user traffic for users that are males.

Further, the drop down menu 432 may update the map with user traffic for a particular merchant. To illustrate, upon selection of a particular auto detailing merchant, the map may be updated to show user traffic for users that have shown a threshold level of interest in the particular merchant. The users may have a particular level of interest in the particular merchant when, for example, the users have "checked-in" to the merchant, merchants of a similar type to the particular merchant, and/or locations in proximity to the merchant more than a threshold number of times.

The drop down menu 434 may update the map with user traffic for a particular time of day (e.g., a particular period of time). For example, upon selection of a 5-9 PM time period, the map may be updated to show user traffic for the time period between 5 PM and 9 PM. Although the interface 400 includes the drop down menus 428-434, it should be appreciated that other types of drop down menus may be used to filter other types of user traffic. For example, the interface 500 may include a drop down menu for merchant type such that selection of a particular merchant type (e.g., auto detailing) may update the map to show user traffic for users that have shown a threshold level of interest in the particular merchant type (e.g., users that have "checked-in" to venues associated with automobiles).

In FIG. 5, the interface 500 shows a calendar view to enable a user to view user traffic in a graph format (e.g., demand over time). In this example, the interface 500 includes a monthly calendar 502, however, it should be appreciated that other time periods may be used for the calendar, such as a day view, week view, year view, etc. By selecting on a particular day in the calendar 502, a window 504 may be presented showing a graph of demand over a particular time period for information selected in the filter window 426. For instances, when the restaurant category is selected in the drop down menu 428 and the downtown region is specified in a location field 506, the window 504 may display user traffic (e.g., demand) for users that have shown a threshold level of interest in restaurants (e.g., through "check-ins" to restaurants). In some instances, by making a different type of selection of the particular day (e.g., right click on mouse), the interface 500 may enable a user to schedule a deal on that particular day and to specific one or more parameters for offering the deal for acquisition.

As similarly discussed above with respect to the interface 400 of FIG. 4, the interface 500 may include the filter window 426 to enable a user to filter the types of user traffic that is presented in the interface 500. Further, in the interface 500 the filter window 426 includes the location field 506 to specify a particular region for which demand will be shown. As also illustrated, the interface 500 includes elements 508(1) and (2) to enable a user to navigate to different months shown in the calendar 502.

Example Process

Figure 6:
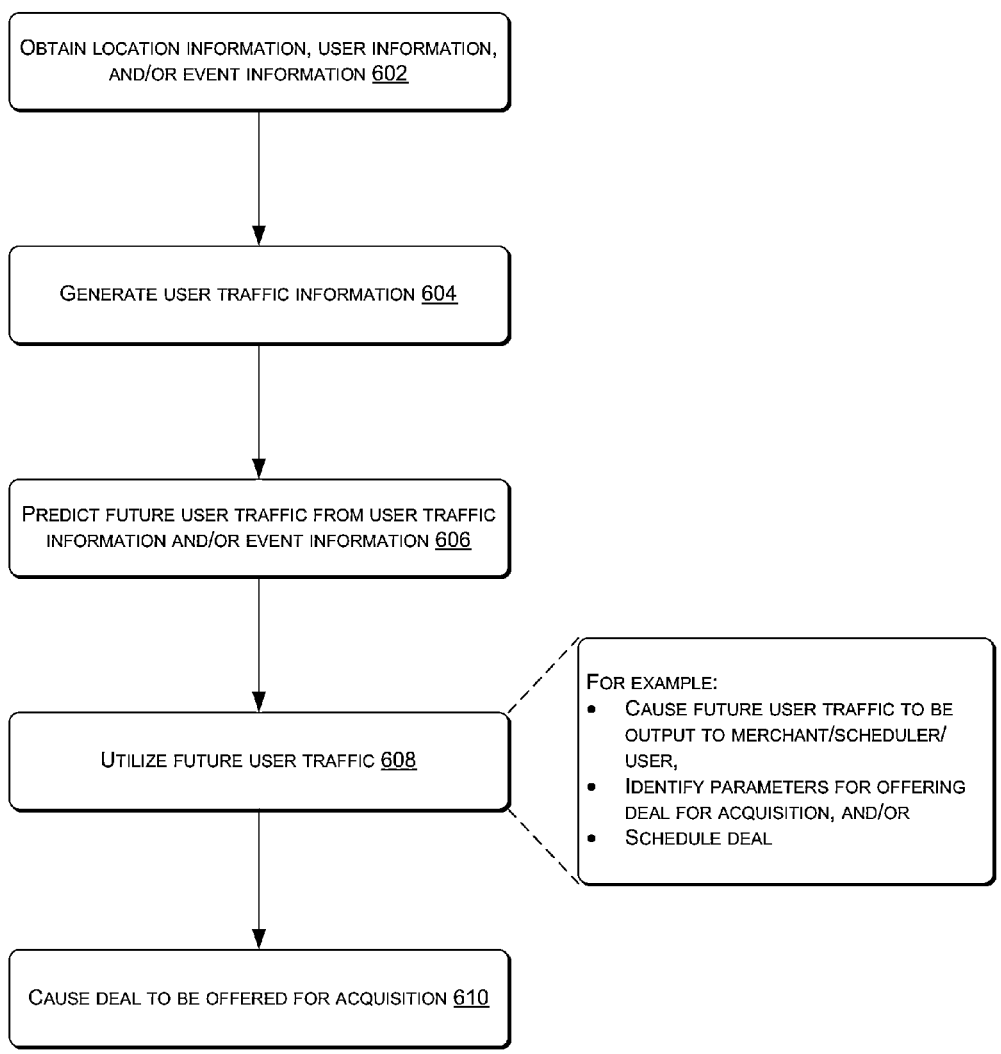
FIG. 6 illustrates an example process for scheduling deals for acquisition based on predicted user traffic.

FIG. 6 illustrates an example process 600 for employing the techniques described herein. For ease of illustration the process 600 is described as being performed in the architecture 100 of FIG. 1. For example, one or more of the individual operations of the process 600 may be performed by the service provider 102 (e.g., the devices 116). However, the process 600 may be performed in other architectures and the architecture 100 may be used to perform other processes.

The process 600 (as well as each process described herein) is illustrated as a logical flow graph, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process. In some instances, any number of the described operations may be omitted.

At 602, the service provider 102 may obtain location information for multiple users, user information for multiple users, and/or event information. In some instances, the location information and/or user information are obtained from a location-based service, such as social networking service. The user information may indicate user attributes, user preferences, and/or user statuses. The event information may indicate details about an event, such as when and where the event will be held, an estimated number of participants, and so on.

At 604, the service provider 102 may generate user traffic information from the location information and/or user information. The user traffic information may indicate locations where the multiple users have been located over time. For example, the traffic information may indicate user congregation areas over time and/or the types of users that congregate in these areas. In one example, the user traffic information includes time series data indicating the locations over time.

At 606, the service provider 102 may predict future user traffic from the user traffic information and/or the event information. The future user traffic may indicate an estimated number of users that will be located (e.g., congregate) in one or more geographical regions over time. In some instances, the future user traffic also indicates a type of users that will congregate in the one or more geographical regions. Further, in some instances, a particular geographical region is identified based on a deal that will be offered for acquisition in the particular geographical region and/or a merchant of the particular geographical region. Here, future user traffic may be predicted for the particular geographical region knowing in advance that the geographical region will be used to offer a deal for acquisition.

At 608, the service provider may utilize the future user traffic. For example, the service provider 102 may cause the future user traffic to be output to the user 132 of the merchant 104, the scheduler 126 of the service provider 102, and/or another user (e.g., a consumer). The future user traffic may be utilized to view demand over time for a deal, deal/item category, merchant, merchant type, geographical region, and/or user type (e.g., users of a same preference, attribute, or status).

Further, the future user traffic may be utilized by the service provider 102, the user 132, and/or the scheduler 126, to identify one or more parameters for offering a deal. The one or more parameters may comprise a time period during which to offer the deal for acquisition, an amount of discount to apply to the deal when offering the deal for acquisition (e.g., 30% off), a geographical region in which to offer the deal for acquisition, and/or a merchant associated with the deal.

Moreover, the future user traffic may be utilized to automatically schedule a deal. For example, when it is determined that the future user traffic satisfies one or more criteria during a time period (e.g., a threshold number of users will be located in a particular geographical region during the time period), the service provider 102 may automatically schedule a deal to be published to the region during the time period.

At 610, the service provider 102 may cause a deal to be offered for acquisition based on scheduling of the deal at 608. The deal may be offered for acquisition through an online site (e.g., an online deal website), an application (e.g., an application of a portable device), a notification (e.g., an email, text message, or telephone call), and so on.

CONCLUSION

Although embodiments have been described in language specific to structural features and/or methodological acts, it is to be understood that the disclosure is not necessarily limited to the specific features or acts described. Rather, the specific features and acts are disclosed herein as illustrative forms of implementing the embodiments.

What is claimed is:

1. A method comprising:
under control of one or more computing systems configured with specific executable instructions,
obtaining location information for each of a plurality of users, each piece of the location information indicating a location shared by one of the plurality of users through a location-based service;
generating user traffic information from the location information of the plurality of users, the user traffic information indicating locations where the plurality of users were previously located;
identifying a deal to be offered for acquisition in a geographical region, the deal comprising an offer of an item for acquisition at a discounted value;
predicting future user traffic for the geographical region based on the user traffic information;
determining that the future user traffic satisfies one or more criteria during a time period;
determining an amount of discount to apply to the deal when offering the deal for acquisition based at least in part on the future user traffic; and
offering the deal for acquisition in the geographical region during the time period.

2. The method of claim 1, wherein each piece of the location information comprises check-in information indicating a venue at which one or more of the plurality of users is located.

3. The method of claim 1, wherein each piece of the location information comprises real-time data indicating a current location of one or more of the plurality of users.

4. The method of claim 1, wherein:
the future user traffic indicates an estimated number of users that will be located within the geographical region; and
determining that the future user traffic satisfies one or more criteria comprises determining that the estimated number of users is greater than a threshold.

5. The method of claim 4, wherein the amount of discount to apply to the deal is based at least in part on the estimated number of users indicated by the future user traffic.

6. The method of claim 5, wherein determining the amount of discount comprises determining a first amount of discount when the estimated number of individuals is less than another threshold and determining a second amount of discount when the estimated number of individuals is greater than or equal to the other threshold, the second amount of discount being less than the first amount of discount.

7. A system comprising:
one or more processors;
memory communicatively coupled to the one or more processors;
a location information module maintained in the memory and executable by the one or more processors to obtain location information for each of a plurality of users, each piece of the location information indicating a location of one of the plurality of users;
a user traffic generation module maintained in the memory and executable by the one or more processors to generate user traffic information from the location information of the plurality of users;
a prediction module maintained in the memory and executable by the one or more processors to predict, based at least in part on the user traffic information, future user traffic for one or more geographical regions associated with a deal or a merchant of the deal, the deal comprising an offer of an item provided by the merchant, the future user traffic indicating a predicted number of users that will be located within the one or more geographical regions; and
a deal scheduling module maintained in the memory and executable by the one or more processors to schedule the deal for acquisition in the one or more geographical regions based at least in part on the future user traffic.

8. The system of claim 7, wherein each piece of the location information comprises check-in information shared one of the plurality of users through a location-based service.

9. The system of claim 7, wherein each piece of the location information comprises one or more of traffic report data indicating a location through which one of the plurality of users has traveled, acquisition history data indicating a location at which one of the plurality of users acquired an item, mobile device data indicating a location at which a mobile device associated with one of the plurality of users was located, or call history data indicating a location at which one of the plurality of users made a call.

10. The system of claim 7, wherein each piece of the location information is free of user identification information that identifies one of the plurality of users.

11. The system of claim 7, wherein the deal scheduling module is further executable by the one or more processors to determine, based at least in part on the future user traffic, a time period to offer the deal for acquisition.

12. The system of claim 7, wherein the deal scheduling module is further executable by the one or more processors to determine, based at least in part on the future user traffic, an amount of discount to apply to the deal when offering the deal for acquisition.

13. The system of claim 7, wherein the deal scheduling module is executable by the one or more processors to schedule the deal by:
causing the future user traffic to be output to a merchant or a user of the system; and
receiving input from the merchant or the user specifying at least one of a time period to offer the deal for acquisition or an amount of discount to apply to the deal when offering the deal for acquisition.

14. The system of claim 7, wherein the deal to be offered for acquisition comprises an attribute that is related to a preference or attribute of the plurality of users.

15. The system of claim 7, wherein the deal scheduling module is executable by the one or more processors to schedule the deal by automatically scheduling the deal during a time period in which the future user traffic is greater than a threshold.

16. The system of claim 7, wherein:
the location information module is further executable by the one or more processors to obtain event information indicating a location of a scheduled event; and
the prediction module is executable by the one or more processors to predict the future user traffic based at least in part on the event information.

17. A method comprising:
under control of one or more computing systems configured with specific executable instructions,
aggregating location information for a plurality of users;
identifying one or more geographical regions associated with a deal or a merchant of the deal, the deal comprising an offer of an item for acquisition;
predicting a number of the plurality of users that will be located within the one or more geographical regions based at least in part on the aggregated location information of the plurality of users; and
scheduling the deal for acquisition in the one or more geographical regions based at least in part on the predicted number of users.

18. The method of claim 17, further comprising:
based at least in part on the predicted number of users, determining a time period to offer the deal for acquisition; and
scheduling the deal to be offered for acquisition during the time period.

19. The method of claim 18, wherein the time period corresponds to a time period during which the predicted number of users is greater than a threshold.

20. The method of claim 17, further comprising:
based at least in part on the predicted number of users, determining an amount of discount to apply to the deal when offering the deal for acquisition; and
scheduling the deal to be offered for acquisition with the determined amount of discount.

21. The method of claim 20, wherein the amount of discount comprises a first amount of discount when the predicted number of users is below a threshold and the amount of discount comprises a second amount of discount when the predicted number of users is greater than or equal to the threshold, the second amount of discount being less than the first amount of discount.

22. The method of claim 17, further comprising:
before causing the deal to be scheduled, determining a preference or attribute of a predicted user of the number of users that will be located within the one or more geographical regions,
wherein the deal to be offered for acquisition comprises at least one attribute that is related to the preference or attribute of the predicted user.

23. The method of claim 17, further comprising:
before predicting the number of the plurality of users that will be located within the one or more geographical regions, obtaining event information indicating a location of a scheduled event;
wherein the number of the plurality of users that will be located within the one or more geographical regions is predicted based at least in part on the event information.

24. One or more computer-readable storage media storing computer-readable instructions that, when executed, instruct one or more processors to perform operations comprising:
obtaining location information for each of a plurality of users;
generating user traffic information from the location information of the plurality of users;
predicting a number of users that will be located within one or more geographical regions based on the user traffic information;
identifying a deal to be offered for acquisition and one or more parameters for offering the deal for acquisition, the deal comprising an offer of an item for acquisition; and
scheduling the deal to be offered for acquisition based at least in part on the one or more parameters and the predicted number of users.

25. The one or more computer-readable storage media of claim 24, wherein the one or more parameters comprise at least one of an amount of discount to apply to the deal when offering the deal for acquisition, a time period during which to offer the deal for acquisition, or a geographical region in which to offer the deal for acquisition.

26. The one or more computer-readable storage media of claim 24, wherein each piece of the location information comprises check-in information shared by one of the plurality of users through a location-based service.

27. The one or more computer-readable storage media of claim 24, wherein the operations further comprise causing a graph of future user traffic to be displayed, the graph indicating the future user traffic over a time period.

28. The one or more computer-readable storage media of claim 27, wherein the future user traffic is specific to a particular deal or item category, merchant, user preference, or user attribute.

* * * * *